United States Patent
Brooks et al.

(10) Patent No.: US 9,481,823 B2
(45) Date of Patent: Nov. 1, 2016

(54) SYNERGISTIC CHEMISTRY TO PREVENT SILICATE SCALING

(71) Applicant: Baker Hughes Incorporated, Houston, TX (US)

(72) Inventors: Johnathon L. Brooks, Richmond, TX (US); Tracey Jackson, Sugar Land, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 0 days.

(21) Appl. No.: 14/533,284

(22) Filed: Nov. 5, 2014

(65) Prior Publication Data

US 2015/0133349 A1 May 14, 2015

Related U.S. Application Data

(60) Provisional application No. 61/902,438, filed on Nov. 11, 2013.

(51) Int. Cl.
- *C09K 8/528* (2006.01)
- *C11D 7/36* (2006.01)
- *C11D 11/00* (2006.01)

(52) U.S. Cl.
CPC ............ *C09K 8/528* (2013.01); *C11D 7/36* (2013.01); *C11D 11/0041* (2013.01)

(58) Field of Classification Search
None
See application file for complete search history.

(56) References Cited

U.S. PATENT DOCUMENTS

| | | | | |
|---|---|---|---|---|
| 3,799,893 A | * | 3/1974 | Quinlan | C02F 5/14 162/48 |
| 5,707,529 A | | 1/1998 | Gill et al. | |
| 8,461,088 B2 | * | 6/2013 | Notte | C02F 5/12 507/235 |
| 2010/0000579 A1 | | 1/2010 | Reinbold et al. | |
| 2011/0130312 A1 | | 6/2011 | Notte et al. | |
| 2013/0264289 A1 | | 10/2013 | Notte et al. | |

OTHER PUBLICATIONS

BASF Corporation, "Sequestrene® 30A Chelate," Material Safety Data Sheet, Jan. 16, 2003.
Arensdorf, J. et al., "Static and Dynamic Testing of Silicate Scale Inhibitors," SPE 132212, SPE Int'l Oil & Gas Conference and Exhibition, Beijing, China Jun. 8-10, 2010.
Dow Oil & Gas, "ACCENT™ Scale Inhibitors," Product Brochure, Sep. 2010.
Baker Hughes, "Silicate Scale Inhibitor Solved Problem in Alkaline-Surfactant-Polymer Flood," Case History, Dec. 8, 2010.
Arensdorf, J. et al., "Mitigating Silicate Scale in Production Wells in an Oilfield in Alberta," SPE 141422, SPE Int'l Symposium on Oilfield Chemistry, The Woodlands, Texas, USA, Apr. 11-13, 2011.

(Continued)

*Primary Examiner* — John J Figueroa
(74) *Attorney, Agent, or Firm* — Mossman Kumar & Tyler PC (57) ABSTRACT

Two intermediates that have known separate efficacy for preventing scales such as calcium carbonate, magnesium carbonate and barite (barium sulfate) were discovered to have a synergistic effect for preventing or inhibiting silicate scaling when used together. Each of these intermediates is ineffective at preventing silicate scaling when used alone; however, when used in combination, they have a synergistic benefit. In one non-limiting embodiment the components include a polyamine phosphonate and a lysine tetra(alkylene)phosphonate.

12 Claims, 6 Drawing Sheets

(56) References Cited

OTHER PUBLICATIONS

Sonne, J. et al., "Potential for Inhibitor Squeeze Application for Silicate Scale Control in ASP Flood," SPE 154331, SPE EOI Conference at Oil and Gas West Asia, Muscat, Oman, Apr. 16-18, 2012.

Sonne, J. et al., "Application of Silicate Scale Inhibitors for ASP Flooded Oilfields: A Novel Approach to Testing and Delivery," SPE 154332, SPE Int'l Conference and Exhibition on Oilfield Scale, Aberdeen, UK, May 30-31, 2012.

Thermphos, "DEQUEST® FS0520," Material Safety Data Sheet, Jun. 26, 2012.

Baker Hughes, "SCW260 Scale Inhibitor," Material Safety Data Sheet, Oct. 26, 2012.

Dyer, S.J., et al., "Thermal stability of generic barium sulphate scale inhibitor species under static and dynamic conditions," Jnl of Petroleum Science & Engring, vol. 37, No. 3, pp. 171-181 (2003).

Int'l Search Report and Preliminary Report on Patentability in PCT/US2014/064219, dtd May 17, 2016.

\* cited by examiner

SYNERGISTIC CHEMISTRY TO PREVENT SILICATE SCALING

CROSS-REFERENCE TO RELATED APPLICATION

This application claims the benefit of U.S. Provisional Patent Application No. 61/902,438 filed on Nov. 11, 2013, incorporated herein by reference in its entirety.

TECHNICAL FIELD

The present invention relates to methods and compositions for inhibiting or preventing silicate scaling, and more particularly relates, in one non-limiting embodiment, to chemical blends of at least two components, which blend inhibits or prevents magnesium and calcium silicate scaling synergistically better than either of the two components used separately.

BACKGROUND

Alkaline surfactant polymer (ASP) floods in sandstone reservoirs are associated with silicate scaling of production wells for oil (petroleum). Silicate scaling has been a significant problem in ASP-flooded fields in China and Canada.

ASP flooding is a tertiary enhanced oil recovery (EOR) method designed to lower interfacial tension (IFT), water wet the formation, and decrease water mobility necessary to produce residual oil. The ASP flood uses a combination of alkali, surfactant and polymer to achieve these results. The flood requires extensive surface equipment used for mixing the components and injection through strategically placed wells.

ASP floods often induce silicate scaling as the alkaline phase increases the pH to a level that some naturally occurring silicon species dissolve. Common types of silica deposit encountered is the precipitation of magnesium silicate and calcium silicate. This deposition is strongly dependent on the pH and the temperature of the system as well as the actual concentration of magnesium and/or calcium itself. In systems above pH 9, magnesium silicate is very likely to form due to the presence of magnesium hydroxide and silicate ions. Other hydroxide salts such as calcium, strontium and sodium can react with silicate ions; however, the resulting products are much more soluble and will revert back to the ionic phase more readily. Additionally, if calcium is present in the connate water then contact in the production well with high pH ASP water will promote the formation of calcium carbonate scale (calcite). Calcium, similarly to magnesium, can serve as a nuclei or bridge to aid in the formation of colloidal silicate particles and increase silicate scale.

Silicate scale is very difficult to remove from oil wells once it has formed and traditionally has required mechanical removal. Various polymers and other chemicals have been developed that act as inhibitors of amorphous silica and magnesium silicate scales.

In summary, the type and amount of silicate scale observed is dependent on several factors including pH, magnesium concentration, and the magnesium to calcium ratios. Over the lifetime of an ASP flood these factors will change across the field and individual wells giving varying scale precipitations with time and from well to well.

It would be desirable to develop new and/or alternative compositions and methods that would inhibit or prevent the formation of silicate scales.

SUMMARY

There is provided, in one non-limiting version, a method for inhibiting or preventing the formation of silicate scales, which method comprises adding to a fluid having a potential for silicate scaling an amount of a chemical blend effective to inhibit or prevent the formation of silicate scales, where the chemical blend includes, but is not necessarily limited to, at least one first chemical that is a polyamine phosphonate and at least one second chemical that is a lysine tetra(alkylene)phosphonate.

In another non-restrictive embodiment, there is provided a chemical blend for inhibiting or preventing the formation of silicate scales in a fluid having a potential for silicate scaling, where the chemical blend includes, but is not necessarily limited to, at least one first chemical that is a polyamine phosphonate and at least one second chemical that is a lysine tetra(alkylene)phosphonate.

DETAILED DESCRIPTION

It has been discovered that two intermediate chemicals that have known benefits for preventing carbonate scale formation, such as calcium carbonate scale and magnesium carbonate formation, as well as for preventing barite formation (barium sulfate) were discovered to have a synergistic effect for preventing or inhibiting silicate scaling when used together. Each of the intermediates is ineffective at preventing silicate scaling when used alone. However, when used in combination, they have a synergistic benefit.

In one non-limiting embodiment the components in the silicate scale inhibiting blend include at least one first chemical, including, but not necessarily limited to, a polyamine phosphonate, and the like, and at least one second chemical, including, but not necessarily limited to, a lysine tetra(alkylene)phosphonate. A suitable polyamine phosphonate is diethylenetriamine (DETA) phosphonate. A suitable lysine tetra(alkylene)phosphonate is lysine tetra(methylene) phosphonate (LTMP). Other potential candidates for the second chemical include, but are not necessarily limited to, arginine tetra(alkylene)phosphonate and/or histadinetetra (alkylene)phosphonate. One particularly suitable LTMP is DEQUEST® FS0250 liquid, available from Thermphos Dequest UK Ltd. Other liquids that may be used in addition to or in place of DEQUEST® FS0250 liquid include, but are not necessarily limited to, DEQUEST® 3000S, DEQUEST® FS0531, DEQUEST® 9510, and DEQUEST® FS9513 liquids.

In the silicate scale inhibiting blend, the amount of polyamine phosphonate ranges from about 0.1 independently to about 50 wt %, and the amount of lysine tetra (alkylene)phosphonate ranges from about 0.1 independently to about 50 wt %. Alternatively, the amount of polyamine phosphonate ranges from about 1 independently to about 36 wt %, and the amount of lysine tetra(alkylene)phosphonate ranges from about 1 independently to about 36 wt %. In another non-limiting embodiment, the amount of polyamine phosphonate ranges from about 2 independently to about 25 wt %, and the amount of lysine tetra(alkylene)phosphonate ranges from about 2 independently to about 25 wt %. The word "independently" as used herein with respect to a range means that any lower threshold may be combined with any upper threshold to form a suitable alternative range.

Silicate scales that may be inhibited or prevented from forming in fluids include, but are not necessarily limited to, magnesium silicate, calcium silicate, strontium silicate, sodium silicate, iron silicate, aluminum silicate, and combinations thereof. It is expected that most of the fluids in which the silicate scale inhibitor blends will find utility are aqueous, such as in the oilfield (e.g. in the ASP flooding process) or in industrial waters (e.g. in boiler water). It is not expected that the silicate scale inhibitor blends and methods will have as much use with respect to liquids that are largely non-aqueous, e.g. hydrocarbonaceous liquids, however, they may find utility in preventing silicate scale formation in oil/water or water/oil emulsions in some contexts. In the oilfield context, fluids that may be suitable to be treated are those in locations that include, but are not necessarily limited to, a surface tank, a surface conduit, a wellbore, a subterranean formation, and combinations thereof. The chemical blends may be applied by any number of methods used for delivery of chemicals into a reservoir stream or other stream, including, but not necessarily limited to a capillary string, or injection down the annulus of a well with or without a backside flush. The silicate scale inhibition blend may also be used via an umbilical for deep water applications.

It can be difficult to determine in advance what the amount of the chemical blend is to add to a fluid having the potential for silicate scaling which will be effective to inhibit or prevent the formation of silicate scales in that fluid, since a number of factors can affect silicate scale formation including, but not necessarily limited to, pH, polyvalent cation concentration, temperature, and the ratio of calcium to magnesium.

Laboratory screening experiments, trial-and-error iterative processes and the like may be necessary to find the optimum dosage level for any particular application. Nevertheless to give some idea of suitable dosages, the effective amount of the chemical blend in the liquid ranges from about 10 ppm independently to about 10,000 ppm. Alternatively, the dosage may range from about 300 ppm independently to about 1650 ppm, in another non-limiting embodiment from about 400 ppm independently to about 1500 ppm, and in a different non-restrictive embodiment from about 500 ppm independently to about 1000 ppm.

Suitable solvents and additives may be used in the chemical blends herein including, but not necessarily limited to, methanol (MeOH) and monoethylene glycol (MEG), for instance to lower the freezing point to "winterize" the blend.

As mentioned, it has been discovered that the methods and compositions described herein give synergistic results. Synergistic results are described herein as where silicate scaling is inhibited or prevented better than the added results from identical methods where only the first chemical is used alone and only the second chemical is used alone.

Since the water chemistry from wells in different phases of an ASP flood has significantly differing pH, silicon, and other influencing ion concentrations, a brine chemistry that would give a high precipitation of silicate scale was chosen for laboratory testing to make the differences in chemistry performance more visible. Field brine from troubled wells was not severe enough to easily distinguish differences in test chemistries.

The water chemistry used in the testing was meant to represent a highly aggressive scaling tendency for both silicates and carbonates. The test water was formulated by making three waters and then combining them in equal amounts. The Cation Water (CW) contained the predominant scaling cations of calcium and magnesium. The Anion Water (AW) contained the predominant scaling anions for carbonate scale and allowed the water to be pH buffered to the test pH of 10. The ASP Water (ASPW) contained the silicon ion (from $Na_2SiO_3.5H_2O$) for the silicate scale. Compositions are given in Table I.

TABLE I

Water Chemistry for the Test Brine for DOE using Turbiscan

| Ions | Concentration (mg/L)(resulting combined brine totals) |
|---|---|
| Cation Water (CW) | |
| $Na^+$ | 4215 (2810) |
| $Mg^{2+}$ | 300 (100) |
| $Ca^{2+}$ | 300 (100) |
| Anion Water | |
| $HCO_3^-$ | 14340 (4780) |
| $Na^+$ | 4215 (2810) |
| $CO_3^{2-}$ | 570 (190) |
| ASP Water | |
| $Si^{2+}$ (as $SiO_2$) | 1500 (500) |

A Design of Experiment (DOE) project was undertaken to statistically evaluate contributions and interactions of several known scale inhibitors, raw materials and/or intermediates. A number of candidates were chose for the DOE as others were removed for compatibility reasons or underperformance in preliminary performance evaluations. The DOE software was used to produce 31 different blends using four active materials: ACCENT™ 1131 carboxylic sulfonated nonionic terpolymer scale inhibitor available from Dow Chemical Company, VERSENE™ 100 chelating agent available from Dow Chemical Company, DEQUEST FS0520 and diethylenetriamine (DETA) phosphonate. To evaluate these blends a TURBISCAN™ AGS screening system was used to scan each sample for a four hour period recording the percent transmission on a time and depth profile. The test procedure used the test brine composite by adding a known volume of the AW and the same volume of the ASPW to a clean glass container. The blend was then added at a concentration of 300 ppm of the total volume. The CW was then added and the container was sealed and shaken before the solution was transferred into the test container. The DOE produced a model showed the influences of the constituents that were tested and how the scaling tendency was affected. The model that was produced was shown to be statistically significant. The actual and predicted values matched up very well.

When evaluating the DOE model it was seen that DEQUEST FS0520 and diethylenetriamine (DETA) phosphonate worked well in conjunction with each other and seemed to give the highest positive interactions. In order to attempt to produce blends that would be both winterized and gas lift qualified, 30% monoethylene glycol (MEG) was added to each of the two resulting laboratory blends Chemical A and Chemical B, which were further evaluated. Chemical A consisted of 30.0 wt % ethylene glycol solvent, 36.0 wt % DEQUEST FS0620, and 34.0 wt % diethylenetriamine (DETA) phosphonate. Chemical B consisted of 30.0 wt % ethylene glycol solvent, 46.0 wt % DEQUEST FS0620, and 24.0 wt % diethylenetriamine (DETA) phosphonate.

In order to attempt to prove that the two new lab blends (Chemical A and Chemical B) were more effective at inhibiting silicate and carbonate scale than the incumbent Baker Hughes Incumbent A silicate scale inhibitor the Test Brine was once again utilized along with a single sample Turbiscan. The testing sequence was as shown in Table II.

TABLE II

Listing of the Test Run Number, Product with Concentration and the Separability Number

| Test No. | Product (concentration) | Separability Number |
|---|---|---|
| 1 | Incumbent A (500 ppm) | 8.36 |
| 2 | Chemical A (250 ppm) | 3.14 |
| 3 | Chemical B (250 ppm) | 9.73 |
| 4 | Chemical A (500 ppm) | 0.9 |
| 5 | Chemical A (1000 ppm) | 0.15 |
| 6 | Incumbent A (1000 ppm) | 4.12 |
| 7 | Blank (0 ppm) | 9.9 |
| 8 | Incumbent A (2000 ppm) | 3.12 |
| 9 | Chemical A (2000 ppm) | 0.08 |
| 10 | Incumbent A (4000 ppm) | 0.15 |
| 11 | Chemical B (1000 ppm) | 0.17 |
| 12 | Chemical B (500 ppm) | 1.09 |
| 13 | Chemical B (2000 ppm) | 0.05 |

Each test run was converted from percent transmission to Absorbance (AU) and graphed alongside similar blends based on concentration of active components for ease of comparison. Additionally, a "Separability Number" was calculated for each test run to give a measure of how much scaling there was by looking at the relative standard deviation of the percent transmission over time and depth. In general, the lower the Separability Number the lower the scaling tendency. As can be seen in Table II, the lowest two Separability Numbers correspond to Chemical A and Chemical B, respectively.

Figure 1:
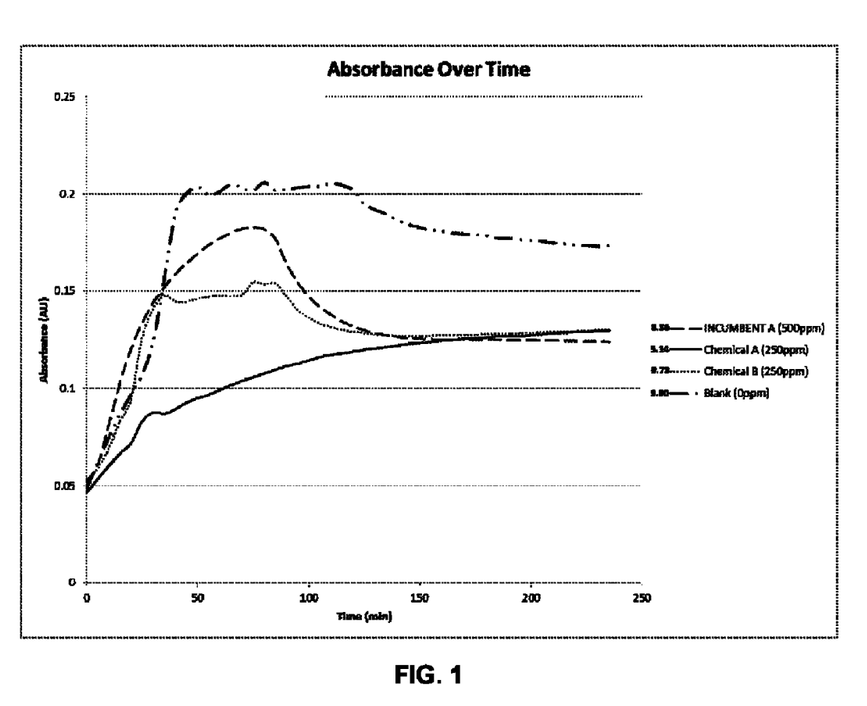
FIG. 1 is a graph of absorbance over time of a blank, an incumbent product Incumbent A at 500 ppm, and two chemical blends Chemical A and Chemical B at 250 ppm, where increased absorbance is an indication of increased scaling.

The blends of Chemical A and Chemical B consistently have lower Separability Numbers and lower absorbance values. When evaluating these graphs it is important to note that the crest of the line is important as this can be indicative of a large amount of scaling (increase in turbidity) before the scale began to settle to the bottom of the test container. As can be seen in FIG. 1, Chemical A at 250 ppm did not see the same crest in the graph as the other test runs and it also had the lowest Separability Number. FIG. 1 is a graph of absorbance over time of the blank, the incumbent product Incumbent A at 500 ppm, and two chemical blends Chemical A and Chemical B at 250 ppm. The number at the end of each graphed line represents the Separability Number.

Figure 2:
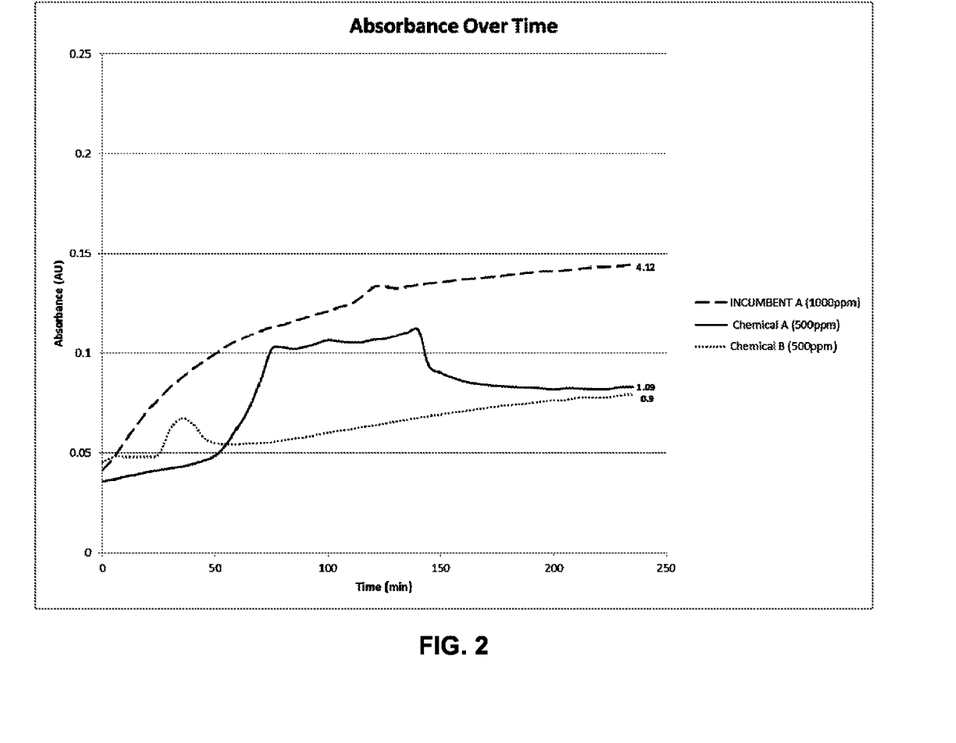
FIG. 2 is a graph of absorbance over time of the incumbent product Incumbent A at 1000 ppm, and the two blends Chemical A and Chemical B at 500 ppm.
Figure 3:
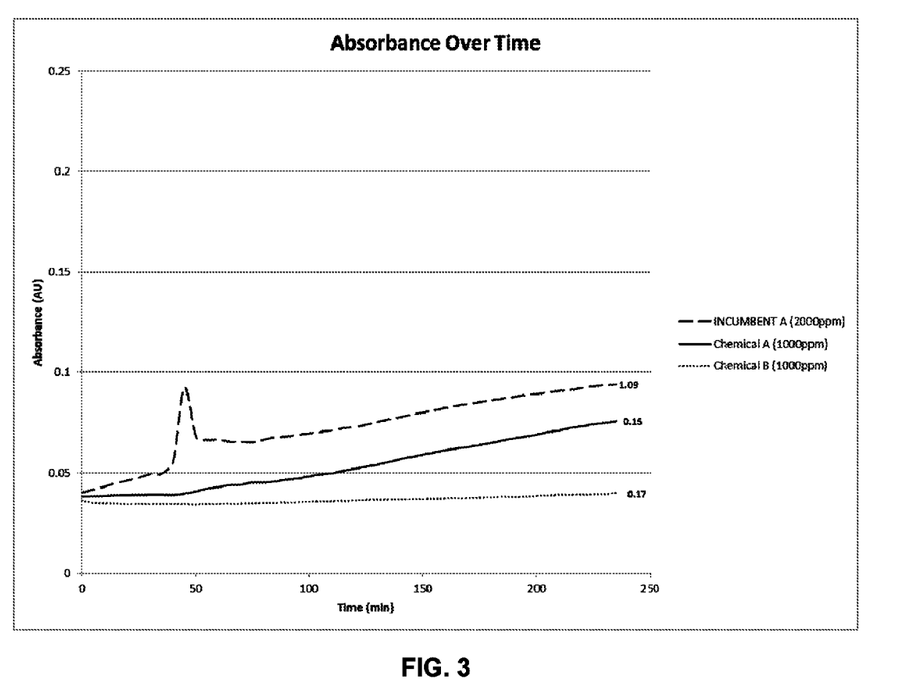
FIG. 3 is a graph of absorbance over time of the incumbent product Incumbent A at 2000 ppm, and the two blends Chemical A and Chemical B at 1000 ppm.
Figure 4:
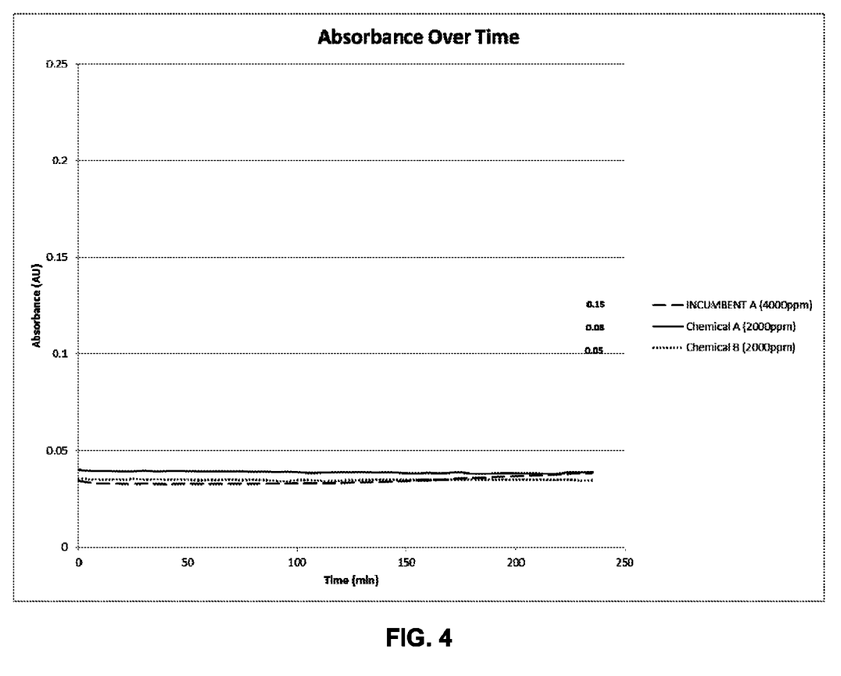
FIG. 4 is a graph of absorbance over time of the incumbent product Incumbent A at 4000 ppm, and the two blends Chemical A and Chemical B at 2000 ppm.

FIG. 2 is a graph of absorbance over time of the incumbent product Incumbent A at 1000 ppm, and the two blends Chemical A and Chemical B at 500 ppm. The results are similar to FIG. 1: Chemical A ppm did not see the same crest in the graph as the other test runs and it also had the lowest Separability Number. The results were similar for the Examples in FIGS. 3, 4 and 5.

Subsequent testing was undertaken to show that the chosen synergistic lab blend, Chemical A, would be able to outperform not only Incumbent A with the DOE test brine but also outperform all the incumbent products at their known usage ranges. Using a Decision Model, a test matrix was developed in order to ensure that Chemical A would be tested against each of the incumbent products at or near their strength as designated by this model. To do this testing nine solutions were made. Forty eight tests were run mixing these nine brines in a way to attempt to cover as much of the Decision Model as possible. Absorbance was observed after four hours. All testing was done at 37° C. using a CARY® 100 UV-Vis thermal block spectrophotometer with 12 sample multi-cell with individualized stir bars in each cuvette to keep the solution intermixed throughout the testing duration.

Looking at graphical representations of comparisons of Chemical A versus the incumbent at a particular pH, magnesium concentration, or $SiO_2$ concentration, makes it much clearer as to how this new blend performs. In this follow up testing, just as before, the concentration of Chemical A is consistently half of the incumbent during testing.

Figure 5:
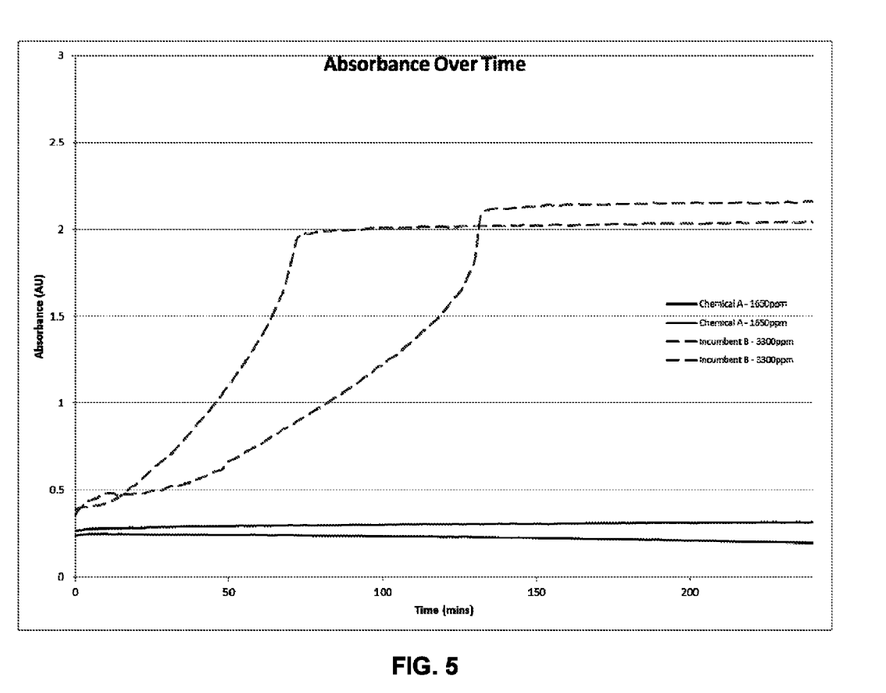
FIG. 5 is a graph of absorbance over time, comparing an incumbent product Incumbent B at 3300 ppm with the blend Chemical A at 1650 ppm for a pH of 10.8, a magnesium concentration of 4 ppm and a $SiO_2$ concentration of 100 ppm.

FIG. 5 shows a graph of absorbance over time, comparing an incumbent product Incumbent B at 2000 ppm with the blend Chemical A for a pH of 10.8, a magnesium concentration of 4 ppm and a $SiO_2$ concentration of 100 ppm. As can be seen in FIG. 5, Chemical A has a far lower absorbance across the four hour test period indicating a much lower scaling tendency than Incumbent B for a pH of 10.8, magnesium concentration of 4 ppm, and $SiO_2$ concentration of 100 ppm.

Figure 6:
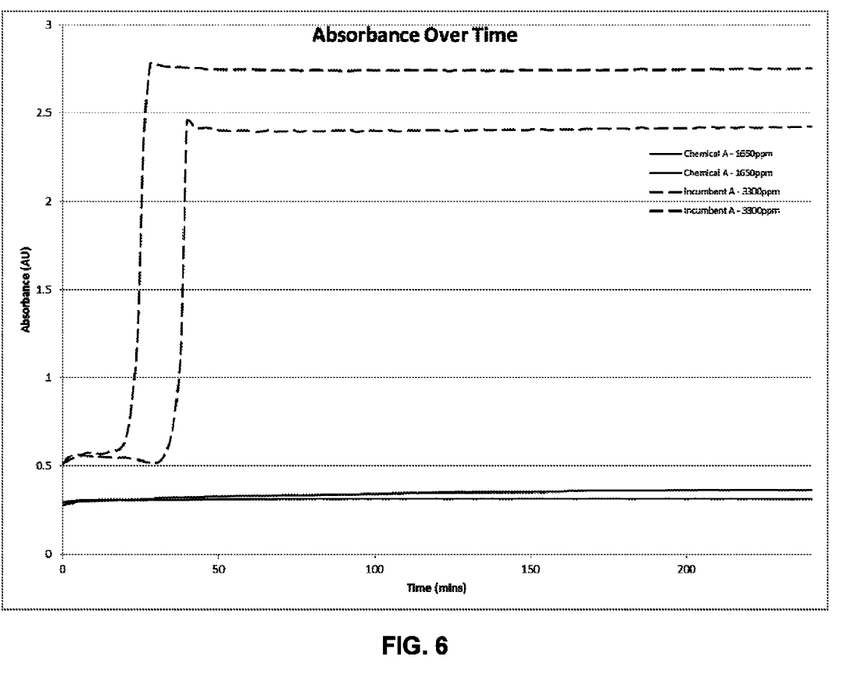
FIG. 6 is a graph of absorbance over time, comparing the incumbent product Incumbent A at 2000 ppm with the blend Chemical A for a pH of 9.5, a magnesium concentration of 0 ppm and a $SiO_2$ concentration of 500 ppm.

FIG. 6 is a graph of absorbance over time, comparing the incumbent product Incumbent A at 2000 ppm with the blend Chemical A for a pH of 9.5, a magnesium concentration of 0 ppm and a $SiO_2$ concentration of 500 ppm. As can be seen in FIG. 6, Chemical A has a far lower absorbance across the four hour test period indicating a much lower scaling tendency than Incumbent A for a pH of 9.5, magnesium concentration of 0 ppm, and $SiO_2$ concentration of 500 ppm.

In the foregoing specification, the invention has been described with reference to specific embodiments thereof, and it is expected to be effective in inhibiting and preventing the formation of silicate scales. However, it will be evident that various modifications and changes can be made thereto without departing from the broader spirit or scope of the invention as set forth in the appended claims.

Accordingly, the specification is to be regarded in an illustrative rather than a restrictive sense. For example, specific first and second chemicals, other than those specifically exemplified or mentioned, and/or in different proportions, falling within the claimed parameters, but not specifically identified or tried in a particular application to inhibit or prevent silicate scales, are within the scope of this invention. The terms "first chemical" and "second chemical" are used herein for the purpose of simplifying the categories of chemicals that may be added to the chemical blend and are not intended to limit the order by which the chemicals may be added to the chemical blend. The arrangement as listed within each combination is also not intended to limit the order by which the chemicals may be added to the chemical blend. More than one chemical may be used from the first chemical group and/or from the second chemical group. Similarly, it is expected that the inventive compositions will find utility in inhibiting and preventing the formation of silicate scales for other fluids besides those in the oil field.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed. For instance, there is provided a method for inhibiting or preventing the formation of silicate scales, which method consists essentially of or consists of adding to a fluid having a potential for silicate scaling an amount of a chemical blend effective to inhibit or prevent the formation of silicate scales, where the chemical blend comprises, consists essentially of or consists of at least one first chemical that is a polyamine phosphonate; and at least one second chemical that is a lysine tetra(alkylene)phosphonate.

There may also be provided in a non-limiting embodiment a chemical blend for inhibiting or preventing the formation of silicate scales in a fluid having a potential for silicate scaling, where the chemical blend consists essentially of or consists of at least one first chemical that is a polyamine phosphonate; and at least one second chemical that is a lysine tetra(alkylene)phosphonate.

What is claimed is:

1. A method for inhibiting or preventing the formation of silicate scales, which method comprises adding to a fluid having a potential for silicate scaling an amount of a chemical blend effective to inhibit or prevent the formation of silicate scales, where the chemical blend comprises:
    at least one first chemical that is a polyamine phosphonate; and
    at least one second chemical that is a lysine tetra(alkylene)phosphonate.

2. The method of claim 1 where the polyamine phosphonate is diethylenetriamine (DETA) phosphonate and where the lysine tetra(alkylene)phosphonate is lysine tetra(methylene)phosphonate (LTMP).

3. The method of claim 1 where in the chemical blend:
    the amount of the polyamine phosphonate ranges from about 0.1 to about 50 wt %, and
    the amount of the lysine tetra(alkylene)phosphonate ranges from about 0.1 to about 50 wt %.

4. The method of claim 1 where the effective amount of the chemical blend in the fluid ranges from about 10 ppm to about 10,000 ppm.

5. The method of claim 1 where the silicate scales that are inhibited or prevented are selected from the group consisting of magnesium silicate, calcium silicate, strontium silicate, sodium silicate, iron silicate, aluminum silicate, and combinations thereof.

6. The method of claim 1 where silicate scaling is inhibited or prevented better than the added results from identical methods where only the first chemical is used alone and only the second chemical is used alone.

7. The method of claim 1 where the fluid is at a location selected from the group consisting of a surface tank, a surface conduit, a wellbore, a subterranean formation, and combinations thereof.

8. A method for inhibiting or preventing the formation of silicate scales, which method comprises adding to a fluid having a potential for silicate scaling from about 10 ppm to about 10,000 ppm, based on the fluid, of a chemical blend effective to inhibit or prevent the formation of silicate scales, where the chemical blend comprises:
    from about 0.1 to about 50 wt %, based on the total chemical blend, of at least one first chemical that is a polyamine phosphonate; and
    from about 0.1 to about 50 wt %, based on the total chemical blend, of at least one second chemical that is a lysine tetra(alkylene)phosphonate.

9. The method of claim 8 where the polyamine phosphonate is diethylenetriamine (DETA) phosphonate and where the lysine tetra(alkylene)phosphonate is lysine tetra(methylene)phosphonate (LTMP).

10. The method of claim 8 where the silicate scales that are inhibited or prevented are selected from the group consisting of magnesium silicate, calcium silicate, strontium silicate, sodium silicate, iron silicate, aluminum silicate, and combinations thereof.

11. The method of claim 8 where silicate scaling is inhibited or prevented better than the added results from identical methods where only the first chemical is used alone and only the second chemical is used alone.

12. The method of claim 8 where the fluid is at a location selected from the group consisting of a surface tank, a surface conduit, a wellbore, a subterranean formation, and combinations thereof.

* * * * *